April 17, 1945.  F. B. HARVUOT  2,374,094
LIQUID TREATING APPARATUS
Filed Feb. 28, 1942  3 Sheets-Sheet 1

Frank B. Harvuot
INVENTOR.
BY Edmund W.E. Kamm

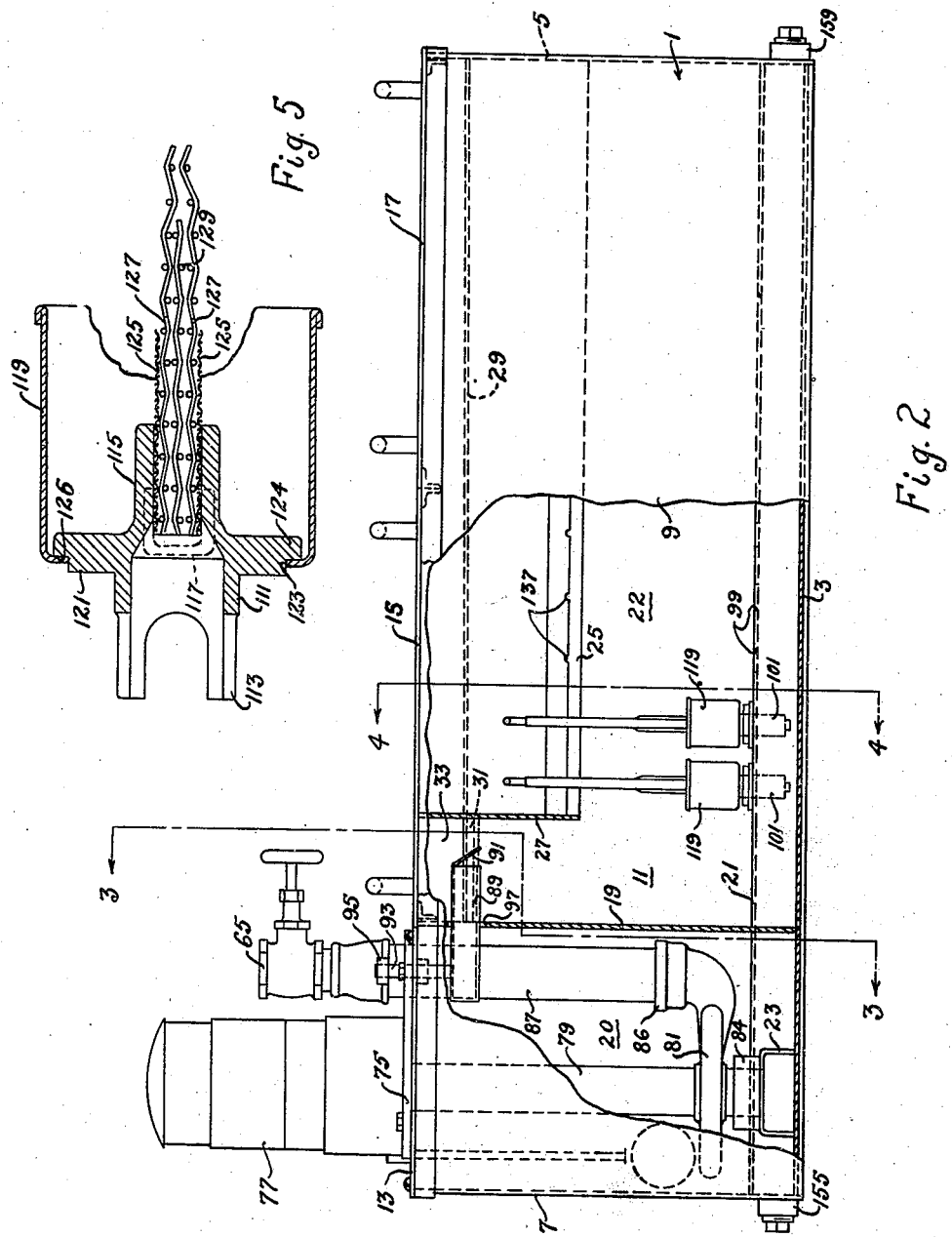

April 17, 1945.  F. B. HARVUOT  2,374,094
LIQUID TREATING APPARATUS
Filed Feb. 28, 1942  3 Sheets-Sheet 3

Frank B. Harvuot
INVENTOR.
BY Edmund W. E. Kamin
ATTORNEY.

Patented Apr. 17, 1945

2,374,094

UNITED STATES PATENT OFFICE 2,374,094

LIQUID TREATING APPARATUS

Frank B. Harvuot, Fort Wayne, Ind., assignor to S. F. Bowser & Company, Incorporated, Fort Wayne, Ind., a corporation of Indiana Application February 28, 1942, Serial No. 432,851

5 Claims. (Cl. 210—43)

This invention relates to means for reconditioning fluids which are used as coolants in cutting, grinding or other machine operations. More specifically, it relates to a device for removing chips and other heavy particles from a fluid by subjecting the fluid to settling and filtration.

An object of the invention is to provide an apparatus of the kind described in which the liquid to be cleaned is first subjected to a gravity separation operation and thereafter to a filtration operation.

Another object of the invention is to provide a filtration system in which the filtrate may be diverted either to be again filtered or to a filtrate tank.

Still another object of the invention is to provide a pump for drawing the unfiltered liquid through and from the filter and a discharge pump for forcing the filtrate to the point of use, together with means for indicating when the liquid supply for the discharge pump is being exhausted.

Another object of the invention is to provide a filter tank having submerged filtrate outlet connections, together with filter leaves which are provided with compartments for receiving any cake which may drop from the leaf.

Another object of the invention is to provide gravitational separating means comprising sediment pans which are removable for cleaning.

Still another object of the invention is to provide a filtering compartment from which liquid is withdrawn through filter leaves by a filtrate pump, having an inlet adjacent the filtrate discharge pump so that the filtrate can be returned to the filtering compartment.

Yet another object is to provide a movable discharge for said filtrate pump so that the filtrate may be diverted at will into the filtering compartment or into the filtrate storage.

These and other objects will become apparent from a consideration of this specification in connection with the drawings which are attached hereto and made a part hereof wherein:

Figure 2 is a side elevation of the device with part of the tank broken away to show the filtrate pump and filtration compartment.

Figure 5 is a section taken on the line 5—5 of Figure 4 showing the outlet nozzle and screen structure.

Figure 1:
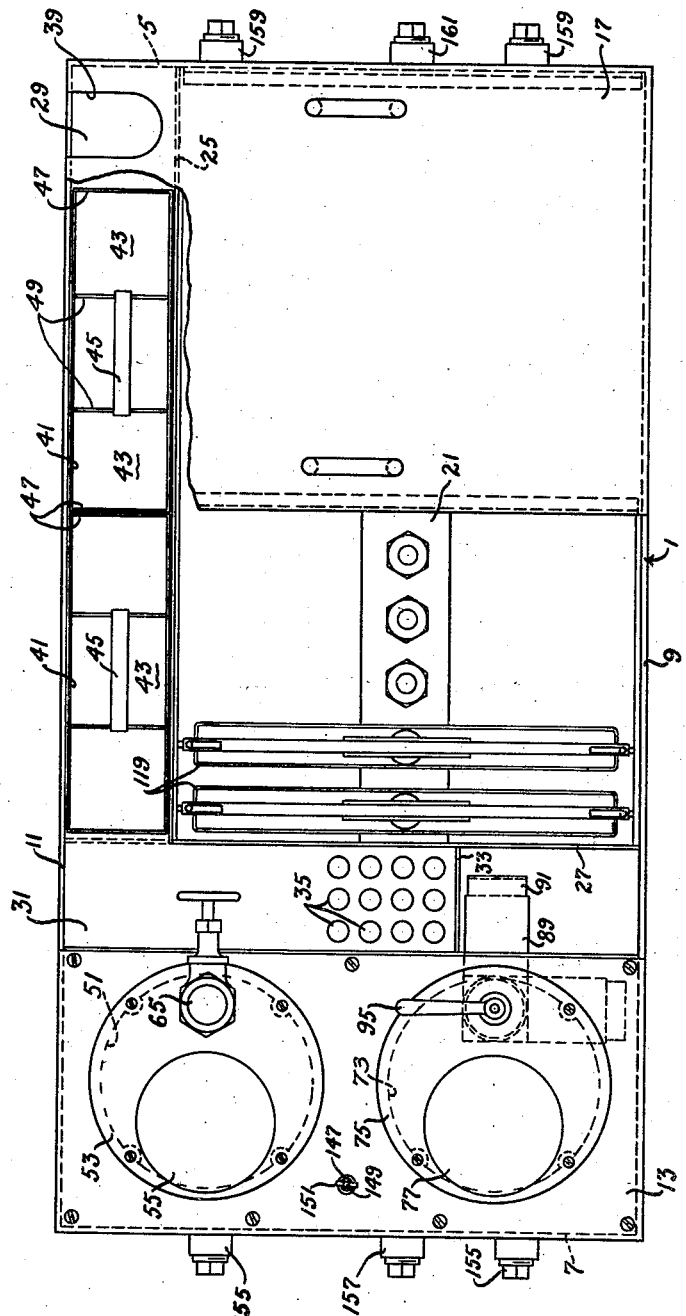
Figure 1 is a plan view with part of the covers removed to show the gravity separation and filtering compartments.
Figure 3:
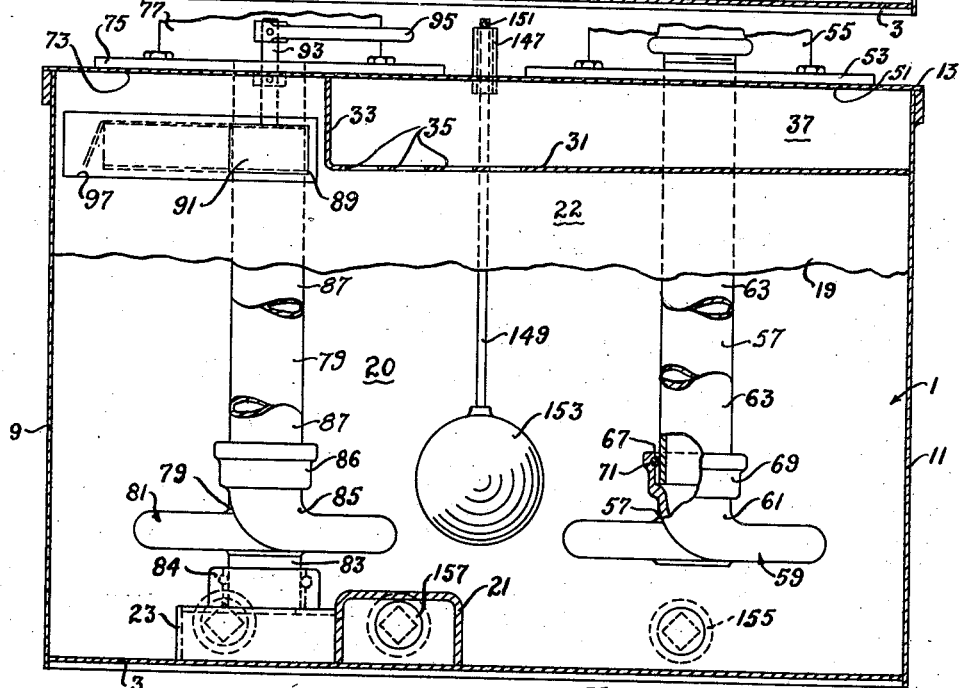
Figure 3 is a sectional view taken on the line 3—3 of Figure 2 showing the pumps, indicator and inlet trough.

Referring to Figures 1 to 3, the numeral 1 represents a tank having a bottom 3, end walls 5 and 7, side walls 9 and 11, a top plate 13 covering one end of the tank, two removable covers 15 and 17, and a transverse bulkhead 19 at the edge of plate 13 so as to form a filtrate reservoir 20 at one end under the plate and a filtering tank 22 under the covers.

An inverted channel 21 is welded to the bottom and to the end walls of the tank and a branch channel 23 is welded to the bottom in compartment 20 and has its outer end closed. The branch extends laterally of the channel 21 as shown in Figure 3 and communicates therewith.

A pair of depending plates 25 and 27 are fixed together at right angles and the free end of plate 25 is welded to the end plate 5 while the free end of plate 27 is welded to the side 9. The plates are substantially flush with the top of the tank and extend down into the tank about one-third of the depth thereof.

A narrow sheet 29 which slopes gently from end plate 5 toward bulkhead 19 is welded between the end 5, side plate 11 and plate 25. A similar sheet 31 is welded to strip 29, side 11, bulkhead 19 and plate 27. The sheet is bent upwardly as at 33 (Figure 3) and is perforated at 35. The sheet 31 slopes gradually from side 11 to the end 33 so that liquid deposited in the trough 37, formed as just described at the corner formed by 5 and 11, will flow gradually down to the perforations 35 and will then drop down into filtering compartment.

As shown in Figure 1, the cover 17 is cut away at 39 to permit the insertion of a pipe leading from the machine or reservoir containing the liquid to be treated.

A plurality of trays 41 having several compartments 43, and provided with handles 45 are loosely set in the trough 37. The end walls 47 and separating walls 49 of the trays are preferably lower than the sides so that the liquid in flowing from the inlet end down to the perforations will flow over the trays or baskets. The trays are preferably made of solid metal.

A circular opening 51 is formed in the cover plate 13 and a motor support plate 53 is adapted to be bolted in position over the opening. The plate carries a motor 55 and a depending pipe 57 which is connected at its lower end to the casing of a centrifugal pump 59. The inlet to the pump is at the bottom of the casing, and the discharge 61 of the pump is turned upwardly and connects with a discharge pipe 63 which projects through the plate 53 and is provided with a valve 65 which is in turn connected by pipe or other suitable conduit to a machine or other reservoir.

The connection between the pump discharge 61 and pipe 63 is self sealing and comprises a groove 67 formed in the discharge bell 69 in which is seated a ring or torus 71 of synthetic rubber material.

The pump and discharge pipe may be lifted through the opening 51 when the plate 53 is unbolted. The motor, pump, discharge pipe and plate assembly are thus removable as a unit.

The pipe 57 houses the drive shaft (not shown) which connects the motor 55 with the impeller of the pump.

It is obvious, of course, that a pump other than a centrifugal pump may be used if desired.

An opening 73 is formed in plate 13 and a second plate 75 which supports motor 77 and shaft housing 79 is adapted to be bolted in place over the opening. A centrifugal pump 81 is supported on 79 and the inlet opening of the pump case is connected by a suction stub 83 to the branch channel 23. A rubber ring seal 84 like that described above serves to seal the suction connection.

The outlet 85 of the pump is connected by a seal 86 similar to that of pump 59 to a discharge pipe 87. The top of the pipe is provided with a laterally directed discharge spout 89 which has a deflector 91 at its outer end.

Fixed to the spout, in axial alignment with the pipe 87, is a shaft 93 which has bearing in the plate 75 and which is provided with a lever 95. The operator by applying force to the lever can swing the spout to discharge either into the compartment 20 or compartment 22. The pipe 87 will turn in the rubber ring of seal 86 to effect this direction of the spout.

The bulkhead 19 is provided with an opening 97 so that the spout may be projected through it into tank 22.

Figure 4:
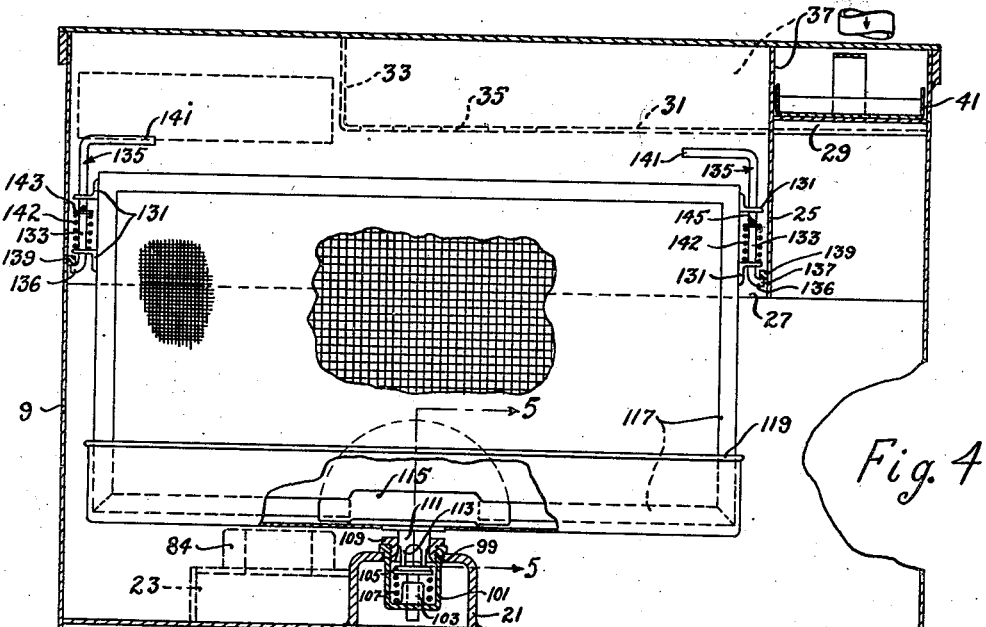
Figure 4 is a section taken on the line 4—4 of Figure 2 showing a filter leaf and its connections and supports and the gravitation tray in the inlet trough.

The channel 21 is provided with a series of openings 99 which are threaded internally to receive a plurality of valve cages 101 (see Fig. 4). Each cage is provided with a valve guide 103, a valve 105 having its stem fitted into the guide and a valve spring 107. A valve seat 109 is screwed into the cage at the end facing the valve. The spring is adapted to force the valve into closed relation against the seat.

A filter leaf, shown particularly in Figures 4 and 5, is provided with an outlet tube or nozzle 111 which fits snugly within the bore of the valve seat and which has a plurality of longitudinal projections 113. The projections are adapted to engage the valve and force it downward against the action of the spring as the nozzle is inserted in the seat.

The nozzle 111 comprises a saddle 115 which straddles the U-edging 117 surrounding the screens of the filter leaf and is fixed thereto.

Fixed to the bottom of the saddle is a cake collecting pan 119. The nozzle has a plug portion 121 which projects through an opening 123 in the bottom of the pan. A flange 124 on the nozzle helps to seal this joint.

As is clearly shown in Figure 5, the two fine filtering screens 125 form the outer or filtering surface of the leaf. These screens are usually 24 by 110 mesh of .016 and .010 wire respectively.

There are two coarse screens 127, which are about 4 mesh, number 16 wire, disposed between the fine screens to support them against the differential pressure, during operation. A semi-circular piece of coarse screen 129 is interposed between the screens 127 so as to insure adequate channels for the passage of liquid from the filtering area to the outlet nozzle 111.

Angle clips 131 are fixed on the U-edging at the sides of the leaf so as to project outwardly therefrom. The clips are perforated to receive the shank portions 133 of clamps 135. The lower end of each shank is bent outwardly as at 136 and is adapted to engage notches 137 in a cleat 139. The upper end of the shank is provided with a handle 141. A spring 142 surrounds the shank between the clips 131 and a washer 143 is disposed on the upper end of the spring to serve as a seat. A pin 145 is inserted in the shank above the washer.

One cleat 139 is fixed to the plate 25 while the other is fixed to the side wall 9.

A guide 147 is welded in the top plate 13 and a float rod 149 is passed through it and held against withdrawal by a pin 151. A float 153 is fixed to the lower end. The float is buoyant in oil or whatever liquid is to be handled and hence indicates the level of oil in the tank 20.

Drain connections 155 are formed in the end wall 7 and serve to drain the compartment 20. A drain 157 drains the channels 21, 23. Two drain connections 159 connected to wall 5 drain the compartment 22, while 161 drains the channels 21, 23 from this end of the container.

*Operation*

When the nozzle 111 is inserted in the valve seat the valve 105 will be opened. The handles 141 will be parallel to the sides of the tank and when the downward movement of the leaf is stopped by the valve, further depression of a handle 141 will, through pin 145 and washer 143, compress the spring 142 and bring the end 136 below the level of the cleat. Turning the handle 141 parallel with the filter leaf and releasing it will cause the end 136 to engage the cleat and a little rotational adjustment of the screen to a position parallel with the end wall 5, if it is not already parallel, will cause the end 136 to snap into the notch 137. The leaf will be thus held firmly in place and the valve 105 will be held open.

If any one of the filter screens is not placed in position, the spring 107 will hold the associated valve 105 closed.

The operator will place a suitable amount of diatomaceous earth or other filter aid material on the plate 31 so that incoming liquid will carry it into the filtering compartment 22.

The spout 89 is turned to the position shown in Figure 2 so that it discharges into 22. The flow of liquid to be filtered is also started and when the level in the tank is above the filter leaves, the pump 81 will be started. If necessary, some filter aid can be added directly to the tank.

The pump, since its suction side is connected to the channels 21, 23, will apply a vacuum to the interior of the filter screens and the slurry mixture is drawn through the screens. As the liquid passes through the fine screens 125, the filter aid will gradually build up on the screens in the form of a cake, which performs the fine filtering operation as is well known to persons skilled in the art. The liquid filtrate is returned to the tank 22 by pump 81, through the discharge pipe

87 and spout 89. The deflector directs the liquid downwardly into the tank.

When the filtrate attains the required clarity, the operator will, by means of handle 95, turn the pipe 87 in seal joint 86 until the spout 89 discharges into the container 20. The pump 59 is started at this time and will draw liquid from tank 20 and discharge it through pipe 63 and valve 65 to the point of use at a rate determined by the setting of valve 65.

The normal capacity of the pump 81 is about twice the normal capacity of the pump 59 so that at the outset, when the rate of flow through the filter leaves is high, the liquid level in the tank 20 will be high and the excess liquid will spill through the opening 97 and re-enter tank 22. The float 153 and the indicator 149 will be up.

As the filtering rate decreases, due to the accumulation of cake on the screens, the rate of discharge of pump 81 approaches that of pump 59 and as it falls below it, the tank 20 will be emptied and the indicator 149 will drop with the liquid level, informing the operator that the screens require cleaning.

This is accomplished by releasing the clamps 135 and lifting the screens out of the tank 22. As a screen is lifted, the valve 105 is closed by its spring so that no appreciable amount of filter aid or dirty liquid can enter the channel 21.

In case the bumps and jars incident to removing a screen should cause the cake to fall, it will be caught in the pan 119. This lengthens the time between cleanings of the tank 22.

In order to increase the filtering cycle, the pans or trays 41 are provided. The liquid entering the device flows over the trays and as it passes over each baffle 47 or 49, it enters a region of comparatively quiescence. Any heavy particles which are not too small sized, will be separated by gravity. These trays can be readily removed by simply lifting them out of the trough 37 and this can be done while the filtering is in progress, if necessary.

After cleaning the screens, the precoating step described above must be again taken before the filtrate can again be diverted to tank 20.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filtration apparatus, a filtering tank, a filtrate tank, a conduit for liquid between said tanks, filter means connected to said conduit, a pump connected to said conduit for drawing liquid through said filter means and discharging it into said filtrate tank, a second pump for withdrawing filtrate from said filtrate tank and supplying it to a point of use, said second pump having a normal capacity less than that of said first pump, and an overflow connection between said filtering and filtrate tanks, said connection being located above the level of said filter means.

2. In a filtration apparatus, a filtering tank, a filtrate tank, a conduit for liquid between said tanks, filter means connected to said conduit, a pump connected to said conduit for drawing liquid through said filter means and discharging it into said filtrate tank, said pump being disposed in said filtrate tank, a discharge pipe rotatably connected to said pump, and a spout on said pipe adapted to discharge into one or the other of said tanks depending on the rotated position of the pipe.

3. In a filtration apparatus, a filtering tank, a filtrate tank, a conduit for liquid between said tanks, filter means connected to said conduit, a pump connected to said conduit for drawing liquid through said filter means and discharging it into said filtrate tank, a second pump for withdrawing filtrate from said filtrate tank and supplying it to a point of use, said second pump having a normal capacity less than that of said first pump, an overflow connection between said filtering and filtrate tanks, said connection being located above the level of said filter means, a discharge spout for said first named pump, and means mounting said spout for rotation to project through said overflow connection or to be withdrawn therefrom.

4. In a filtration apparatus, a filtering tank, a filtrate tank, an inlet for liquid to be treated, an inclined trough arranged to receive said liquid and transport it to said filtering tank, a series of transverse baffles in said trough, a conduit for liquid between said tanks, filter means connected to said conduit, a pump connected to said conduit for drawing liquid through said filter means and discharging it into said filtrate tank, and a second pump for withdrawing filtrate from said filtrate tank and supplying it to a point of use, said second pump having a normal capacity less than that of said first-named pump, and an overflow connection between said tanks, said connection being located above the level of said filter means, said second pump having a spout rotatably connected with it adjacent said connection, said spout being adapted to discharge into said filtrate tank or, when rotated, to extend through said connection to discharge into said filtering tank.

5. In a filtration apparatus, a filtering tank, a filtrate tank, an inlet for liquid to be treated, an inclined trough arranged to receive said liquid and transport it to said filtering tank, a series of removable baskets, comprising transverse baffles, in said trough, a conduit for liquid between said tanks, filter means connected to said conduit, a pump connected to said conduit for drawing liquid through said filter means and discharging it into said filtrate tank, a second pump for withdrawing filtrate from said filtrate tank and supplying it to a point of use, said second pump having a normal capacity less than that of said first pump, an overflow connection between said tanks, said connection being located above the level of said filter means.

FRANK B. HARVUOT.